(12) United States Patent
Shafiee et al.

(10) Patent No.: US 11,321,831 B2
(45) Date of Patent: May 3, 2022

(54) AUTOMATED EVALUATION OF HUMAN EMBRYOS

(71) Applicants: THE BRIGHAM AND WOMEN'S HOSPITAL, INC., Boston, MA (US); The General Hospital Corporation, Boston, MA (US)

(72) Inventors: Hadi Shafiee, Boston, MA (US); Charles Bormann, Boston, MA (US); Manoj Kumar Kanakasabapathy, Boston, MA (US); Prudhvi Thirumalaraju, Boston, MA (US)

(73) Assignees: THE BRIGHAM AND WOMEN'S HOSPITAL, INC., Boston, MA (US); THE GENERAL HOSPITAL CORPORATION, Boston, MA (US)

( * ) Notice: Subject to any disclaimer, the term of this patent is extended or adjusted under 35 U.S.C. 154(b) by 0 days.

(21) Appl. No.: 16/651,269

(22) PCT Filed: Oct. 1, 2018

(86) PCT No.: PCT/US2018/053710
§ 371 (c)(1),
(2) Date: Mar. 26, 2020

(87) PCT Pub. No.: WO2019/068073
PCT Pub. Date: Apr. 4, 2019

(65) Prior Publication Data
US 2020/0226750 A1    Jul. 16, 2020

Related U.S. Application Data

(60) Provisional application No. 62/651,658, filed on Apr. 2, 2018, provisional application No. 62/565,237, filed on Sep. 29, 2017.

(51) Int. Cl.
*G06T 7/00*    (2017.01)

(52) U.S. Cl.
CPC .. *G06T 7/0012* (2013.01); *G06T 2207/10024* (2013.01); *G06T 2207/20036* (2013.01);
(Continued)

(58) Field of Classification Search
CPC ......... G06T 7/0012; G06T 2207/10024; G06T 2207/20036; G06T 2207/20081; G06T 2207/20084; G06T 2207/30044
See application file for complete search history.

(56) References Cited

U.S. PATENT DOCUMENTS 7,907,769 B2    3/2011    Sammak et al.
8,265,357 B2    9/2012    Ramsing et al.
(Continued)

FOREIGN PATENT DOCUMENTS

WO    WO-2014089647 A1 *  6/2014    ............. G06K 9/036

OTHER PUBLICATIONS

Santos Filho, E., J. A. Noble, and D. Wells. "A review on automatic analysis of human embryo microscope images." The open biomedical engineering journal 4 (2010): 170.
(Continued)

*Primary Examiner* — Vu Le
*Assistant Examiner* — Julius Chai
(74) *Attorney, Agent, or Firm* — Tarolli, Sundheim, Covell & Tummino LLP

(57) ABSTRACT

Systems and methods are provided for provided for automatic evaluation of a human embryo. An image of the embryo is obtained and provided to a neural network to generate a plurality of values representing the morphology of the embryo. The plurality of values representing the morphology of the embryo are evaluated at an expert system to provide an output class representing one of a current
(Continued)

quality of the embryo, a future quality of the embryo, a likelihood that implantation of the embryo will be successful, and a likelihood that implantation of the embryo will result in a live birth.

20 Claims, 2 Drawing Sheets

(52) U.S. Cl.
CPC ............... *G06T 2207/20081* (2013.01); *G06T 2207/20084* (2013.01); *G06T 2207/30044* (2013.01)

(56) References Cited

U.S. PATENT DOCUMENTS

| | | | |
|---|---|---|---|
| 9,619,881 B2 | 4/2017 | Maddah et al. | |
| 2004/0076999 A1* | 4/2004 | Faeldt | G06T 7/0012 435/6.18 |
| 2009/0215085 A1* | 8/2009 | Oehninger | G01N 33/5088 435/7.21 |
| 2011/0092762 A1* | 4/2011 | Wong | C12Q 1/6881 600/34 |
| 2012/0257008 A1* | 10/2012 | Taylor | H04N 5/23238 348/36 |
| 2013/0183707 A1 | 7/2013 | Mangoubi et al. | |
| 2014/0087415 A1* | 3/2014 | Ramsing | G01N 33/5005 435/29 |
| 2014/0247972 A1* | 9/2014 | Wang | G06K 9/00147 382/133 |
| 2017/0200264 A1 | 7/2017 | Park et al. | |
| 2017/0200265 A1 | 7/2017 | Bhaskar et al. | |
| 2018/0315190 A1 | 11/2018 | Sasagawa et al. | |
| 2019/0042958 A1 | 2/2019 | Letterie et al. | |
| 2020/0110924 A1* | 4/2020 | Shinoda | G06T 7/70 |

OTHER PUBLICATIONS

Khan, Aisha, Stephen Gould, and Mathieu Salzmann. "Deep convolutional neural networks for human embryonic cell counting." European Conference on Computer Vision. Springer, Cham, 2016.
Kheradmand, Shakiba. Human embryo component detection using computer vision. Diss. Applied Sciences: School of Engineering Science, 2017.
PCT International Search Report and Written Opinion for corresponding Application Serial No. PCT/US2018/053710, dated Dec. 7, 2018, pp. 1-12.
Shin, Hoo-Chang, et al. "Deep convolutional neural networks for computer-aided detection: CNN architectures, dataset characteristics and transfer learning." IEEE transactions on medical imaging 35.5 (2016): 1285-1298.
Tokouka, Yuta, et al. "Convolutional neural network-based instance segmentation algorithm to acquire quantitative criteria of early mouse development." BioRxiv (2018): 324186.
European Search Report for corresponding European Application Serial No. 18862193.2, dated Jun. 9, 2021, pp. 1-9.
Turchi P. (2015) Prevalence, Definition, and Classification of Infertility. In: Cavallini G., Beretta G. (eds) Clinical Management of Male Infertility. Springer, Cham. https://doi.org/10.1007/978-3-319-08503-6_2.
Mascarenhas, Maya N., et al. "National, regional, and global trends in infertility prevalence since 1990: a systematic analysis of 277 health surveys." PLoS Med 9.12 (2012): e1001356.
CDC "2015 Assisted Reproductive Technology Fertility Clinic Success Rates Report", National Center for Chronic Disease Prevention and Health Promotion, Division of Reproductive Health, https://www.cdc.gov/art/reports/2015/fertility-clinic.html, date accessed Nov. 19, 2020.

Birenbaum-Carmeli, Daphna. "'Cheaper than a newcomer': on the social production of IVF policy in Israel." Sociology of Health & Illness 26.7 (2004): 897-924.
Toner, James P. "Progress we can be proud of: US trends in assisted reproduction over the first 20 years." Fertility and sterility 78.5 (2002): 943-950.
Demko, Zachary P., et al. "Effects of maternal age on euploidy rates in a large cohort of embryos analyzed with 24-chromosome single-nucleotide polymorphism-based preimplantation genetic screening." Fertility and Sterility 105.5 (2016): 1307-1313.
Einarsson, Snorri, et al. "Weight reduction intervention for obese infertile women prior to IVF: a randomized controlled trial." Human Reproduction 32.8 (2017): 1621-1630.
Hill, George A., et al. "The influence of oocyte maturity and embryo quality on pregnancy rate in a program for in vitro fertilization-embryo transfer." Fertility and sterility 52.5 (1989): 801-806.
Erenus, Mithat, et al. "The effect of embryo quality on subsequent pregnancy rates after in vitro fertilization." Fertility and sterility 56.4 (1991): 707-710.
Barash, O., et al. "Morphology of the blastocysts is the single most important factor affecting clinical pregnancy rates in IVF PGS cycles with single embryo transfers." Fertility and Sterility 108.3 (2017): e99.
Paulson, Richard J., Mark V. Sauer, and Rogerio A. Lobo. "Embryo implantation after human in vitro fertilization: importance of endometrial receptivity." Fertility and Sterility 53.5 (1990): 870-874.
Osman, A., et al. "The effect of sperm DNA fragmentation on live birth rate after IVF or ICSI: a systematic review and meta-analysis." Reproductive biomedicine online 30.2 (2015): 120-127.
Vargter, Katarina Kebbon, et al. "Which factors are most predictive for live birth after in vitro fertilization and intracytoplasmic sperm injection (IVF/ICSI) treatments? Analysis of 100 prospectively recorded variables in 8,400 IVF/ICSI single-embryo transfers." Fertility and sterility 107.3 (2017): 641-648.
Conaghan, Joe, et al. "Improving embryo selection using a computer-automated time-lapse image analysis test plus day 3 morphology: results from a prospective multicenter trial." Fertility and sterility 100.2 (2013): 412-419.
Wong, C., et al. "Time-lapse microscopy and image analysis in basic and clinical embryo development research." Reproductive BioMedicine Online 26.2 (2013): 120-129.
Racowsky, Catherine, Peter Kovacs, and Wellington P. Martins. "A critical appraisal of time-lapse imaging for embryo selection: where are we and where do we need to go?." Journal of assisted reproduction and genetics 32.7 (2015): 1025-1030.
Filho Santos, E., J. A. Noble, and D. Wells. "A review on automatic analysis of human embryo microscope images." The open biomedical engineering journal 4 (2010): 170.
Machtinger, Ronit, and Catherine Racowsky. "Morphological systems of human embryo assessment and clinical evidence." Reproductive biomedicine online 26.3 (2013): 210-221.
Prados, Fernando J., et al. "The cleavage stage embryo." Human Reproduction 27.suppl_1 (2012): i50-i71.
Hardarson, Thorir & Van Landuyt, Lisbet & Jones, Gayle. (2012). The blastocyst. Human reproduction (Oxford, England). 27 Suppl 1. i172-91. 10.1093/humrep/des230.
Hlinka, D., et al. "Time-lapse cleavage rating predicts human embryo viability." Physiological Research 61.5 (2012): 513.
Cruz, Maria, et al. "Timing of cell division in human cleavage-stage embryos is linked with blastocyst formation and quality." Reproductive biomedicine online 25.4 (2012): 371-381.
Lechniak, Dorota, Emilia Pers-Kamczyc, and Piotr Pawlak. "Timing of the first zygotic cleavage as a marker of developmental potential of mammalian embryos." Reproductive biology 8.1 (2008): 23-42.
Lemmen, J. G., I. Agerholm, and S. Ziebe. "Kinetic markers of human embryo quality using time-lapse recordings of IVF/ICSI-fertilized oocytes." Reproductive biomedicine online 17.3 (2008): 385-391.
Azzarello, A., T. Hoest, and A. L. Mikkelsen. "The impact of pronuclei morphology and dynamicity on live birth outcome after time-lapse culture." Human reproduction 27.9 (2012): 2649-2657.

(56) References Cited

OTHER PUBLICATIONS

Kirkegaard, Kirstine, et al. "Choosing the best embryo by time lapse versus standard morphology." Fertility and sterility 103.2 (2015): 323-332.
Petersen, Bjørn Molt, et al. "Development of a generally applicable morphokinetic algorithm capable of predicting the implantation potential of embryos transferred on Day 3." Human reproduction 31.10 (2016): 2231-2244.
Barrie, Amy, et al. "Examining the efficacy of six published time-lapse imaging embryo selection algorithms to predict implantation to demonstrate the need for the development of specific, in-house morphokinetic selection algorithms." Fertility and sterility 107.3 (2017): 613-621.
Kaser, D. J., et al. "Eeva™ pregnancy pilot study: a randomized controlled trial of single embryo transfer (SET) on day 3 or day 5 with or without time-lapse imaging (TLI) selection." Fertility and Sterility 106.3 (2016): e312.
Chen, Minghao, et al. "Does time-lapse imaging have favorable results for embryo incubation and selection compared with conventional methods in clinical in vitro fertilization? A meta-analysis and systematic review of randomized controlled trials." PloS one 12.6 (2017): e0178720.
Rocha, José Celso, et al. "A method based on artificial intelligence to fully automatize the evaluation of bovine blastocyst images." Scientific reports 7.1 (2017): 1-10.
Rocha, José Celso, et al. "Automatized image processing of bovine blastocysts produced in vitro for quantitative variable determination." Scientific data 4 (2017): 170192.
Matos, Felipe Delestro, José Celso Rocha, and Marcelo Fábio Gouveia Nogueira. "A method using artificial neural networks to morphologically assess mouse blastocyst quality." Journal of Animal Science and Technology 56.1 (2014): 15.
Szegedy, Christian, et al. "Rethinking the inception architecture for computer vision." Proceedings of the IEEE conference on computer vision and pattern recognition. 2016.
He, Kaiming, et al. "Deep residual learning for image recognition." Proceedings of the IEEE conference on computer vision and pattern recognition. 2016.
Szegedy, Christian, et al. "Inception-v4, inception-resnet and the impact of residual connections on learning." arXiv preprint arXiv:1602.07261 (2016).
Chollet, François. "Xception: Deep learning with depthwise separable convolutions." Proceedings of the IEEE conference on computer vision and pattern recognition. 2017.
Glujovsky, Demián, et al. "Cleavage stage versus blastocyst stage embryo transfer in assisted reproductive technology." Cochrane database of systematic reviews 6 (2016).
Papanikolaou, Evangelos G., et al. "Live birth rate is significantly higher after blastocyst transfer than after cleavage-stage embryo transfer when at least four embryos are available on day 3 of embryo culture. A randomized prospective study." Human Reproduction 20.11 (2005): 3198-3203.
Of the American, The Practice Committees. "Blastocyst culture and transfer in clinical-assisted reproduction: a committee opinion." Fertility and Sterility 99.3 (2013): 667-672.
Maheshwari, Abha, Mark Hamilton, and Siladitya Bhattacharya. "Should we be promoting embryo transfer at blastocyst stage?." Reproductive BioMedicine Online 32.2 (2016): 142-146.
Practice Committee of the American Society for Reproductive Medicine. "Guidance on the limits to the number of embryos to transfer: a committee opinion." Fertility and sterility 107.4 (2017): 901.
Martins, W. P., et al. "Blastocyst vs cleavage-stage embryo transfer: systematic review and meta-analysis of reproductive outcomes." Ultrasound in Obstetrics & Gynecology 49.5 (2017): 583-591.
Ebner, T., et al. "Prognostic value of first polar body morphology on fertilization rate and embryo quality in intracytoplasmic sperm injection." Human Reproduction 15.2 (2000): 427-430.
Fisch, Jeffrey D., et al. "The Graduated Embryo Score (GES) predicts blastocyst formation and pregnancy rate from cleavage-stage embryos." Human Reproduction 16.9 (2001): 1970-1975.
Liu, Yanhe, et al. "Assessing efficacy of day 3 embryo time-lapse algorithms retrospectively: impacts of dataset type and confounding factors." Human Fertility 22.3 (2019): 182-190.
Dimitriadis, I., et al. "Cohort embryo selection (CES): a quick and simple method for selecting cleavage stage embryos that will become high quality blastocysts (HQB)." Fertility and Sterility 108.3 (2017): e162-e163.
Simonyan, Karen, Andrea Vedaldi, and Andrew Zisserman. "Deep inside convolutional networks: Visualising image classification models and saliency maps." arXiv preprint arXiv:1312.6034 (2013).

\* cited by examiner

AUTOMATED EVALUATION OF HUMAN EMBRYOS

RELATED APPLICATIONS

The present application claims priority to U.S. Provisional Patent Application Ser. No. 62/565,237 filed Sep. 29, 2017 entitled ARTIFICIAL INTELLIGENCE-BASED SYSTEM FOR EMBRYOLOGY and U.S. Provisional Patent Application Ser. No. 62/651,658 filed Apr. 2, 2018 entitled AUTOMATED PREDICTION OF HUMAN EMBRYO DEVELOPMENTAL FATE, the entire contents of each being incorporated herein by reference in its entirety for all purposes.

TECHNICAL FIELD

The present invention relates generally to the field of medical decision support, and more particularly to automated clinical evaluation of human embryos.

BACKGROUND OF THE INVENTION

Infertility is an underestimated healthcare problem that affects over forty-eight million couples globally and is a cause of distress, depression, and discrimination. Although assisted reproductive technologies (ART) such as in-vitro fertilization (IVF) has alleviated the burden of infertility to an extent, it has been inefficient with an average success rate of approximately twenty-six percent reported in 2015 in the US. IVF remains as an expensive solution, with a cost between $7000 and $20,000 per ART cycle in the US, which is generally not covered by insurance. Further, many patients require multiple cycles of IVF to achieve pregnancy. Non-invasive selection of the top-quality embryo for transfer is one of the most important factors in achieving successful ART outcomes, yet this critical step remains a significant challenge.

Embryos are usually transferred to a patient's uterus during either the cleavage or the blastocyst stage of development. Embryos are described as being at the cleavage stage two or three days after fertilization. Cleavage stage embryos are generally selected for transfer based on cell number, degree of cellular fragmentation and the overall symmetry of the blastomeres. Embryos reach the blastocyst stage five or six days after fertilization. Blastocysts have fluid filled cavities and two distinguishable cell types, the trophectoderm and the inner cell mass (ICM). Blastocysts are generally selected for transfer based on the expansion of the blastocoel cavity and the quality of the trophectoderm and ICM. Traditional methods of embryo selection rely on visual embryo morphological assessment and are highly practice dependent and subjective. In addition, embryos are subject to removal from tightly controlled culture environments during manual assessments, which affects embryos negatively. Advances in time-lapse imaging (TLI) techniques have enabled regular and automated data acquisition of embryo development under controlled environments, along with identifying objective morphokinetic parameters.

SUMMARY OF THE INVENTION

In accordance with an aspect of the present invention, a method is provided for automatic evaluation of a human embryo. An image of the embryo is obtained and provided to a neural network to generate a plurality of values representing the morphology of the embryo. The plurality of values representing the morphology of the embryo are evaluated at an expert system to provide an output class representing one of a current quality of the embryo, a future quality of the embryo, a likelihood that implantation of the embryo will be successful, and a likelihood that implantation of the embryo will result in a live birth.

In accordance with another aspect of the present invention, a system is provided for automatic evaluation of a human embryo. An imager acquires an image of the embryo on a specific day of development. A convolutional neural network calculates from the image of the embryo at least one output value representing one of a current quality of the embryo, a future quality of the embryo, a likelihood that implantation of the embryo will be successful, and a likelihood that implantation of the embryo will result in a live birth.

In accordance with yet another aspect of the present invention, a system is provided for automatic evaluation of a human embryo. An imager acquires an image of the embryo on a specific day of development. A convolutional neural network generates a plurality of values representing the morphology of the embryo from the image of the embryo. An expert system evaluates the plurality of values representing the morphology of the embryo to provide an output class representing one of a current quality of the embryo, a future quality of the embryo, a likelihood that implantation of the embryo will be successful, and a likelihood that implantation of the embryo will result in a live birth.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

Over the past decade, there has been growing interest in studying time-lapse imaging, connecting morphokinetic variables with important outcomes such as blastocyst formation, implantation and pregnancy potential. These advances in time-lapse imaging and new dimensions in embryo development data, have led to the formulation of multiple embryo selection algorithms (ESA), but these algorithms have provided poor predictive value. Studies have shown that the addition of time-lapse imaging systems to conventional manual embryo testing not only did not improve clinical outcomes but also increased the time of the embryo assessment.

Emulating the skill of highly trained embryologists in efficient embryo assessment in a fully automated system is a major unmet challenge in all of the previous work done in embryo computer-aided assessment. Current computer vision methods for embryo assessment are semi-automated, limited to measuring specific parameters providing metrics that require further analysis by embryologists, and require strictly controlled imaging systems. Previous attempts in developing systems using machine-learning approaches have required intensive image preprocessing followed by human-directed segmentation of embryo features for classification. Owing to the dependency of machine-learning approaches on image processing and segmentation, such methods suffer from the same limitations as computer vision techniques. Also, prior machine learning attempts were focused on classifying embryos at the blastocyst stage using limited datasets of mouse and bovine embryo images for training and testing, making the generalizability of their approach for human embryos questionable.

Here, we overcome this challenge by employing a deep neural networks pretrained with a large set of images for transfer learning human embryo classifications at clinically relevant stages of embryonic development. Unlike prior computer-aided algorithms used for embryo assessment, the systems and methods provided herein allows for automated embryo feature selection and analysis at the pixel level without any assistance by an embryologist. In one example, a convolutional neural network is applied to identify the shape, structure and texture variations between morphologically complex embryos. The system is resilient to changes in image illumination and quality due to data acquisition using multiple instruments.

Figure 1:
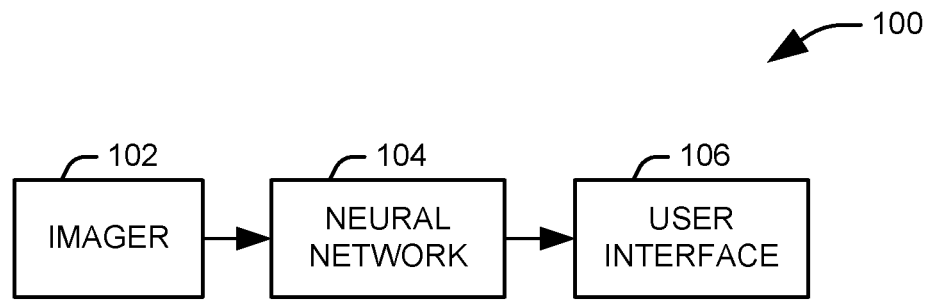
FIG. 1 illustrates a system for automatic evaluation of a human embryo.

FIG. 1 illustrates a system 100 for automatic evaluation of a human embryo. The system 100 includes an imager 102 that acquires an image of the embryo on at least one day of development. For example, the imager 102 can include one or more cameras, capable of producing images in the visible or infrared range, paired with appropriate optics to provide an image of an embryo. In practice, the imager 102 can be implemented to capture images of the embryo at multiple days of development as part of a time-lapse embryo imaging system. In one implementation, the imager 102 includes an attachment for a mobile device that operates with a camera of the mobile device to provide the embryo images. The housing for the attachment can 3-D printed using polylactic acid with dimensions of 82×34×48 mm. An acrylic lens can be included in the housing to provided appropriate magnification for the embryo images.

In another implementation, the imager 102 can be implemented as a stand-alone system with an optical housing that is 3-D printed from polylactic acid and overall dimensions of 62×92×175 mm. The housing contains an electronic circuit with a white light-emitting diode, a three-volt battery, and a single pole double-throw switch. The embryo sample is transilluminated, with a 10x Plan-Achromatic objective lens for image magnification and a complementary metal-oxide-semiconductor (CMOS) image sensor for embryo image data acquisition. The CMOS sensor can be connected to a single-board computer to process the captured images. The imager 102 can be connected to a mobile device via a wireless connection (e.g., Wi-Fi, Bluetooth, or a similar connection) for data processing and visualization.

The one or more images obtained at the imager 102 are provided to a neural network 104 that calculates, from the image of the embryo, at least one output value representing one of a current grade of the embryo, a future grade of the embryo, whether. It will be appreciated that the neural network can be implemented as software instructions stored on a non-transitory computer readable medium and executed by an associated processor. In one example, the neural network 104 can be implemented on a cloud computing system. In one implementation, the neural network 104 can be a convolutional neural network, which is a feed-forward artificial neural network that includes convolutional layers, which effectively apply a convolution to the values at the preceding layer of the network to emphasize various sets of features within an image. In a convolutional layer, each neuron is connected only to a proper subset of the neurons in the preceding layer, referred to as the receptive field of the neuron. In the illustrated example, the convolutional neural network is implemented using the Xception architecture. In one implementation, at least one chromatic value (e.g., a value for an RGB color channel, a YCrCb color channel, or a grayscale brightness) associated with each pixel is provided as an initial input to the convolutional neural network.

In another implementation, the neural network 104 can be implemented as a recurrent neural network. In a recurrent neural network, the connections between nodes in the network are selected to form a directed graph along a sequence, allowing it to exhibit dynamic temporal behavior. In another implementation, the neural network 104 is implemented and trained as a discriminative network in a generative adversarial model, in which a generative neural network and the discriminative network provide mutual feedback to one another, such that the generative neural network produces increasingly sophisticated samples for the discriminative network to attempt to classify.

The results of the neural network 104 can be provided to a user at an associated user interface 106. For example, the user interface 106 can include at least an output device, such as a display, and appropriate software, stored on a non-transitory medium and executed by an associated processor, for receiving the output of the convolutional neural network 104 and presenting it at the output device. In one implementation, the user interface 106 can include a mobile device that communicates wirelessly with the neural network.

The neural network 104 can be trained with images associated with specific time points of the development of an embryo. In one implementation, the neural network 104 is trained on a plurality of images of embryos taken on a first day of embryo development, for example, at eighteen hours after fertilization, that are classified into either a first class, representing normal fertilization of the embryo, or a second class, representing an abnormal fertilization of the embryo. For the purpose of this application, a normally fertilized embryo is an embryo that contains two pronuclei and an abnormally fertilized embryo is an embryo with any other number of pronuclei. Accordingly, in this implementation, abnormal embryos can be detected at an early stage without the intervention of a trained embryologist.

In another implementation, the convolutional neural network 104 is trained on a plurality of images of embryos taken on a third day of embryo development, for example, at seventy hours after fertilization, to select a current grade for the embryo. For the purpose of this application, an embryo can be classified as one of five grades, representing the degree of fragmentation and the variance in size among the cells in the embryo, with a first grade representing equal sized cells and no visible fragmentation, a second grade representing equal sized cells and minimal fragmentation, a third grade representing mostly equal sized cells and moderate fragmentation, a fourth grade in which the cells are of unequal size, with no to moderate fragmentation, and a fifth state representing heavy fragmentation regardless of the variance among the cell sizes.

In still another implementation, the convolutional neural network 104 is trained on a plurality of images of embryos taken on a fifth day of embryo development, for example, at one hundred thirteen hours after fertilization, to select a current grade for the embryo. During the fifth day of development, a normally developing embryo will have developed into a blastocyst. On the fifth day, embryos are conventionally graded based on the combinations of a degree of blastocoel expansion, an inner cell mass quality, and trophectoderm quality along with multiple classes of nonblastocysts. In one example, the classification is binary, simply determining if the embryo is a blastocyst or is not a blastocyst. In another example, the embryos are classified as one of five grades, with a first grade representing embryos that fail to develop to the morula stage, a second grade representing embryos that failed to develop past the morula stage, a third grade that represents early blastocysts, a fourth stage that represents blastocysts that fail to meet the criteria for cryogenic preservation, and a fifth stage representing blastocysts that meet the criteria for cryogenic preservation, and the classifier is trained to distinguish among these five grades.

In a further implementation, the convolutional neural network 104 is trained on a plurality of images of embryos taken on a first day of embryo development to predict a current grade for the embryo on a later day. For example, an image taken at the first day can be used to predict a grade at the third day or a grade at the fifth day. Similarly, an image taken at the third day can be used to predict a grade at the fifth day, including either of the binary determination if the embryo reached the blastocyst stage or a determination among the five grades listed above. And in a still further implementation, the convolutional neural network can be trained on images from one or more days of development, and trained to predict either whether implantation of the embryo will be successful, that is, result in a pregnancy or whether implantation of the embryo will result in a life birth.

The inventors have found that the predictive capability of the convolutional neural network 104 can be enhanced by using the convolutional neural network 104 in combination with another expert system (not shown). In practice, any of a variety of experts systems can be utilized in combination with the convolutional neural network, including support vector machines, random forest, self-organized maps, fuzzy logic systems, data fusion processes, ensemble methods, rule based systems, genetic algorithms, and artificial neural networks. It will be appreciated that the additional expert system may be trained on features from multiple stages of embryonic development as well as with features that are external to the images, such as biometric parameters of an egg donor, a sperm donor, or a recipient of the embryo.

Figure 2:
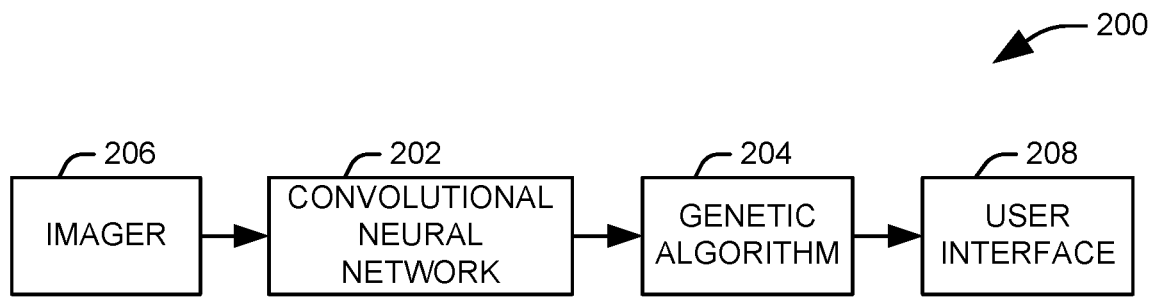
FIG. 2 provides one example of a system in which a convolutional neural network is used in combination with another expert system.

FIG. 2 provides one example of a system 200 in which a convolutional neural network 202 is used in combination with another expert system 204. In this instance, the other expert system is a genetic algorithm 204 that receives the output of the convolutional neural network 202 and generates a metric representing the quality of an embryo being evaluated. Each of the convolutional neural network 202 and the genetic algorithm 204 can be implemented as software instructions stored on a non-transitory computer readable medium and executed by an associated processor. The quality of the embryo can be a binary categorical variable, representing the success or failure of the implantation or a numerical grade of the embryo. In addition to the output of the convolutional neural network, the genetic algorithm 204 can also use biometric parameters representing of one of a patient receiving the embryo, a sperm donor who provided sperm used to create the embryo, an egg utilized to produce the human embryo, and an egg donor who provided the egg in determining a quality of the embryo. Further, the genetic algorithm 204 can utilize the outputs of multiple neural networks in determining the embryo quality, which can include other convolutional neural networks, for example, receiving as input an image of the embryo on a different day of development than the convolutional neural network 202, recurrent neural networks, capsule networks, and generative adversarial networks.

The system 200 includes an imager 206 that acquires an image of for each embryo on at least a fifth day of development. A first training set of embryo images can then be generated from a set of images and a known grade of the embryo on the fifth day and used to train the convolutional neural network, such that an output for each image is a set of five values, each representing the likelihood that the embryo is in one of the five grades defined above for the fifth day of development. It will be appreciated that the features for each embryo can include values external to the image as well as the extracted features from the convolutional neural network 202.

A second training set of images, representing embryos of known quality, can be generated at the imager 206 and provided to the trained convolutional neural network 202 to generate a set of convolutional neural network outputs and known embryo qualities. For example, the known quality can be an outcome of the implantation or an average (e.g., arithmetic mean or median) of numerical grades provided via manual assessment by a set of embryologists from different institutions. This set of outputs and the embryo qualities can be provided as training data to the genetic algorithm. In the illustrated implementation, the chromosome for the genetic algorithm is a set of five weights for the convolutional neural network outputs, and the fitness function is a sum of the absolute or squared error between the weighted outputs of the convolutional neural networks and the known quality of the embryo they represent. The genetic algorithm 204 is an iterative algorithm that generates new solutions from the best candidates in an initial population of candidate solutions, as determined by the fitness function, and eliminates low performing candidate solutions according to the defined fitness function to form a new generation of candidate solutions. This is repeated until a termination event occurs, such as the passage of a predefined time period, the performance of a predetermined number of iterations, or a fitness value that meets a threshold value. New candidate solutions are generated via genetic operators, including mutation, in which values for existing solutions are changed by a random amount, and crossover, in which a set of two or more "parent" solutions are combined, with values for each chromosome of the "child" solution being selected from one of the parents. In some implementations, one or more high performing candidate solutions from each generation are retained across generations, to ensure that existing good solutions are not lost via genetic operations.

The output of the genetic algorithm 204 is a set of weights that optimally predict the quality of the embryo from the outputs of the convolutional neural network 202. This output can be provided to a user at an associated user interface 208. The inventors have found that a combination of the convolutional neural network 202 with a genetic algorithm 204 trained in this manner can provide predictions of implantation outcomes that meet or exceed that of experienced embryologists. As a result, the selection of embryos for transfer can be automated without any significant loss of accuracy.

Figure 3:
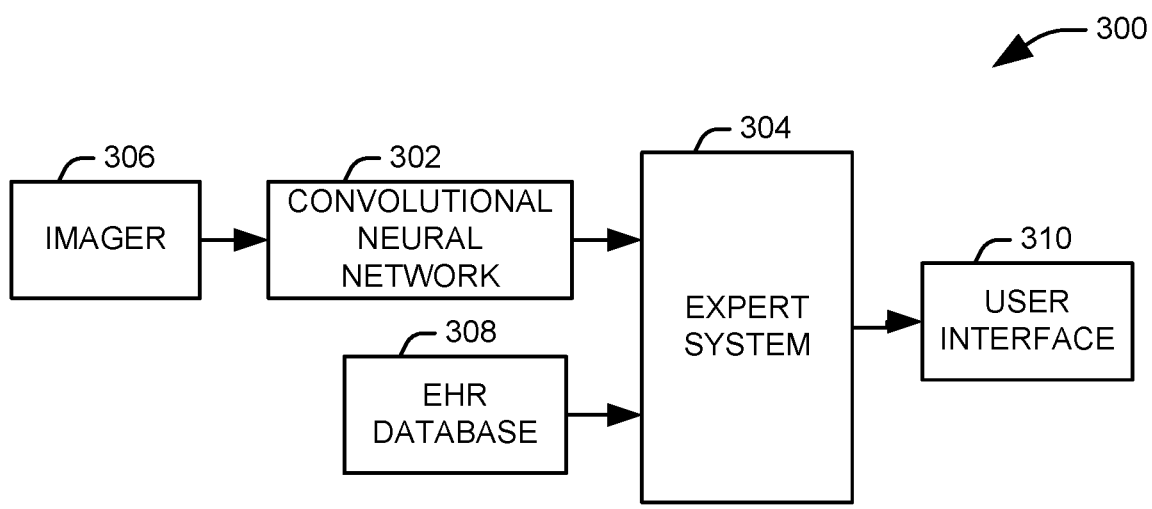
FIG. 3 illustrates another method for selecting and applying a therapeutic intervention for a patient having a disorder.

FIG. 3 provides another example of a system 300 in which a convolutional neural network 302 is used in combination with another expert system 304. In this instance, the other expert system 304 receives the output of the convolutional neural network, as well as a set of additional features, and provides an output representing the likelihood that implantation of the embryo is likely to be successful. In the illustrated implementation, the convolutional neural network 302 is trained separately from the other expert system 304.

The system 300 includes an imager 306 that acquires an image of for each embryo on at least one selected day of development. This image is then provided to the convolutional neural network 302. It will be appreciated, however, that multiple images, taken from different days, can be used at one or multiple convolutional neural networks. The convolutional neural network 302 generates a plurality of values representing the morphology of the embryo from the provided one or more images. This plurality of values, as well as a plurality of features representing biometric parameters of one of a patient receiving the embryo, a sperm donor who provided sperm used to create the embryo, an egg utilized to produce the human embryo, and an egg donor who provided the egg to the expert system, are provided to the expert system 304. The biometric parameters can include, for example, an age of the egg, a body mass index of the patient, an age of the patient, an egg maturation status, a method of fertilization for the embryo, a treatment regime for the patient, a hormonal profile of the patient, and an age of the egg donor, a past diagnosis of a condition of the patient, a past diagnosis of a condition of the sperm donor, and an endometrium thickness of the patient. In the illustrated implementation, the biometric parameters are retrieved from an electronic health records (EHR) database 308.

The expert system 304 provides an output class representing one of a current quality of the embryo, a future quality of the embryo, a likelihood that implantation of the embryo will be successful, and a likelihood that implantation of the embryo will result in a live birth from the plurality of values representing the morphology of the embryo from the provided one or more images and the plurality of biometric features. The output class is then provided to a user at a user interface 310.

In one implementation, the expert system 304 is implemented as a feed-forward neural network. In this approach, the convolutional neural network 302 is pre-trained on training images and the weights within the network are frozen. The feed-forward neural network receives the biometric parameters at an input layer, with the output of the convolutional neural network is injected into a hidden layer of the feedforward neural network. A final layer of the feed-forward neural network can be implemented as a softmax layer to provide a classification result. The feed-forward neural network is trained on embryo images and a known quality for each training image to provide the illustrated system.

Figure 4:
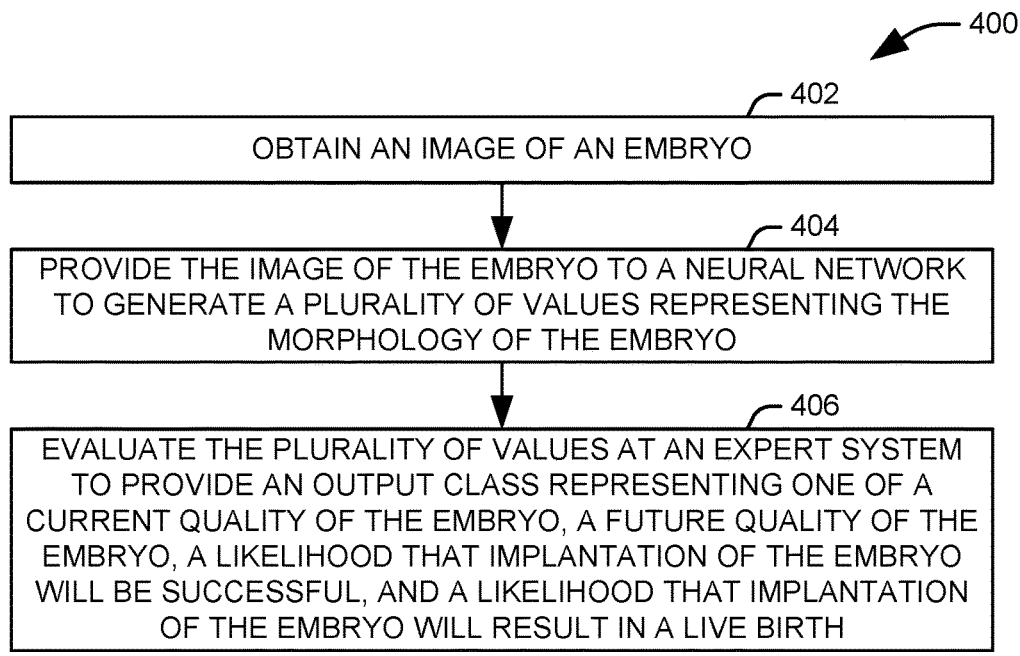
FIG. 4 illustrates a method for automatic evaluation of a human embryo.

In view of the foregoing structural and functional features described above, a method in accordance with various aspects of the present invention will be better appreciated with reference to FIG. 4. While, for purposes of simplicity of explanation, the methods of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 4 illustrates a method 400 for automatic evaluation of a human embryo. At 402, an image of the embryo is obtained. At 404, the image of the embryo is provided to a neural network to generate a plurality of values representing the morphology of the embryo. For example, the neural network can include any of a recurrent neural network, a convolutional neural network, and a discriminative classifier trained as part of a generative adversarial network. At 406, the plurality of values representing the morphology of the embryo are evaluated at an expert system to provide an output class representing one of a current quality of the embryo, a future quality of the embryo, a likelihood that implantation of the embryo will be successful, and a likelihood that implantation of the embryo will result in a live birth.

In one implementation, in addition to the morphological features provided by the neural network, a plurality of features representing biometric parameters of one of a patient receiving the embryo, an egg utilized to produce the human embryo, a sperm donor who provided sperm used to create the embryo, and an egg donor who provided the egg can be provided to the expert system for use in determining the output class. These biometric parameters can include at least one of an age of the egg, a body mass index of the patient, an age of the patient, an egg maturation status, a method of fertilization for the embryo, a treatment regime for the patient, a hormonal profile of the patient, and an age of the egg donor, a past diagnosis of a condition of the patient, a past diagnosis of a condition of the sperm donor, and an endometrium thickness of the patient. For example, the expert system can be implemented as a feedforward neural network. In another implementation, the expert system includes a genetic algorithm that calculates a plurality of weights corresponding to the plurality of values, such that the output is determined as weighted linear combination of the plurality of values.

Figure 5:
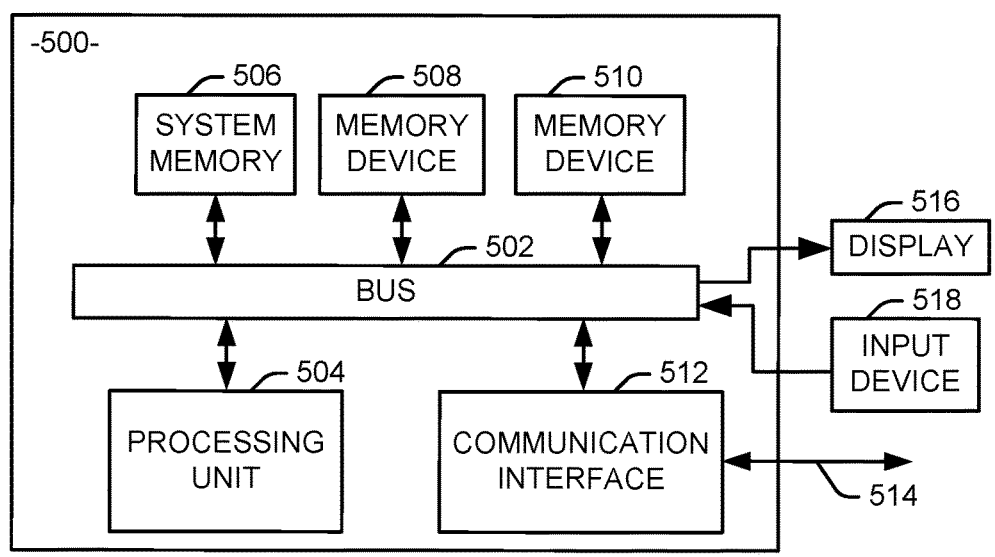
FIG. 5 is a schematic block diagram illustrating an exemplary system of hardware components capable of implementing examples of the systems and methods disclosed herein.

FIG. 5 is a schematic block diagram illustrating an exemplary system 500 of hardware components capable of implementing examples of the systems and methods disclosed in FIGS. 1-4, such as the automated embryo evaluation system illustrated in FIG. 1. The system 500 can include various systems and subsystems. The system 500 can be any of personal computer, a laptop computer, a workstation, a computer system, an appliance, an application-specific integrated circuit (ASIC), a server, a server blade center, or a server farm.

The system 500 can includes a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand-alone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The system 500 could be implemented in a computing cloud. In such a situation, features of the system 500, such as the processing unit 504, the communication interface 512, and the memory devices 508 and 510 could be representative of a single instance of hardware or multiple instances of hardware with applications executing across the multiple of instances (i.e., distributed) of hardware (e.g., computers, routers, memory, processors, or a combination thereof). Alternatively, the system 500 could be implemented on a single dedicated server.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508 and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio, portions of which can be available in formats comprehensible to human beings.

Additionally or alternatively, the system 500 can access an external data source or query source through the communication interface 512, which can communicate with the system bus 502 and the communication link 514.

In operation, the system 500 can be used to implement one or more parts of an embryo evaluation system in accordance with the present invention. Computer executable logic for implementing the composite applications testing system resides on one or more of the system memory 506, and the memory devices 508, 510 in accordance with certain examples. The processing unit 504 executes one or more computer executable instructions originating from the system memory 506 and the memory devices 508 and 510. It will be appreciated that a computer readable medium can include multiple computer readable media each operatively connected to the processing unit.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The terms "computer readable medium" and "machine readable medium" includes, but is not limited to portable or fixed storage devices, optical storage devices, wireless channels, and/or various other storage mediums capable of storing that contain or carry instruction(s) and/or data. It will be appreciated that a "computer readable medium" or "machine readable medium" can include multiple media each operatively connected to a processing unit.

While the principles of the disclosure have been described above in connection with specific apparatuses and methods, it is to be clearly understood that this description is made only by way of example and not as limitation on the scope of the disclosure.

Having described the invention, we claim:

1. A method for fully automatic evaluation of a human embryo, comprising:
   obtaining an image of the embryo representing a specific time point in the development of the embryo;
   generating, from the image of the embryo, a plurality of values representing a morphology of the embryo at a neural network trained on a set of images of embryos representing the specific time point, each image of the set of images being labeled with an output class of a plurality of output classes; and evaluating the plurality of values representing the morphology of the embryo at an expert system to provide an output class of the plurality of output classes, each of the plurality of output classes representing one of a current quality of the embryo, a future quality of the embryo, a likelihood that implantation of the embryo will be successful, and a likelihood that implantation of the embryo will result in a live birth.

2. The method of claim 1, wherein the the neural network is a recurrent neural network.

3. The method of claim 1, wherein the neural network comprises a discriminative classifier trained as part of a generative adversarial network.

4. The method of claim 1, wherein the neural network comprises a convolutional neural network.

5. The method of claim 1, the method further comprising providing a plurality of features each representing biometric parameters of one of a patient receiving the embryo, an egg utilized to produce the human embryo, a sperm donor who provided sperm used to create the embryo, and an egg donor who provided the egg to the expert system, the expert system providing the output class based upon the plurality of values and the plurality of features.

6. The method of claim 5, wherein the expert system is a feedforward neural network.

7. The method of claim 5, wherein the biometric parameters represented by the plurality of features include at least one of an age of the egg, a body mass index of the patient, an age of the patient, an egg maturation status, a method of fertilization for the embryo, a treatment regime for the patient, a hormonal profile of the patient, and an age of the egg donor, a past diagnosis of a condition of the patient, a past diagnosis of a condition of the sperm donor, and an endometrium thickness of the patient.

8. The method of claim 1, wherein the expert system comprises a genetic algorithm that calculates a plurality of weights corresponding to the plurality of values, such that the output is determined as weighted linear combination of the plurality of values.

9. A system for fully automatic evaluation of a human embryo comprising:
   an imager that acquires an image of the embryo at a specific time point in the development of the embryo;
   a convolutional neural network that calculates, from the image of the embryo, at least one output value representing one of a current quality of the embryo, a future quality of the embryo, a likelihood that implantation of the embryo will be successful, and a likelihood that implantation of the embryo will result in a live birth, wherein the convolutional neural network is trained on a set of images, each image of the set of images comprising a training embryo representing the specific time point being labeled with an output value representing one of a current quality of the training embryo, a future quality of the training embryo, a likelihood that implantation of the training embryo will be successful, and a likelihood that implantation of the training embryo will result in a live birth.

10. The system of claim 9, wherein the imager acquires the image of the embryo on a first day of development, and the at least one output value includes a value representing a likelihood that the embryo currently has two pronuclei.

11. The system of claim 9, wherein the imager acquires the image of the embryo on a third day of development, and the at least one output value represents an expected grade of the embryo on a fifth day of development.

12. The system of claim 9, wherein the imager acquires the image of the embryo on a fifth day of development, and the at least one output value represents a current grade of the embryo.

13. The system of claim 12, wherein the embryo is a first embryo of a plurality of embryos, and the at least one output value is a plurality of output values, each representing one of a plurality of possible grades for the embryo on the fifth day of development, the system further comprising an embryo selector that assigns, for each embryo, a score as a weighted linear combination of the plurality of output values weighted by a corresponding plurality of weights.

14. The system of claim 12, wherein the plurality of weights are generated via a genetic algorithm trained on a training set comprising sets of output values for a set of embryos and a corresponding set of outcomes for the set of embryos following implantation of the set of embryos into a patient.

15. The system of claim 9, wherein the imager comprises:
   a white light emitting diode;
   a complementary metal-oxide-semiconductor (CMOS) image sensor; and
   an objective lens connected to the CMOS image sensor.

16. The system of claim 9, wherein the imager comprises a plastic housing containing an acrylic lens and configured to affix to a mobile device, such that the acrylic lens is aligned with a camera of the mobile device.

17. The system of claim 9, further comprising an expert system that receives the at least one output value and a set of values representing biometric parameters of one of a patient receiving the embryo, an egg utilized to produce the human embryo, a sperm donor who provided sperm used to create the embryo, and an egg donor who provided the egg and produces an output representing one of a likelihood that implantation of the embryo will be successful and a likelihood that implantation of the embryo will result in a live birth.

18. The system of claim 17, wherein the biometric parameters represented by the set of values include at least one of an age of the egg, a body mass index of the patient, an age of the patient, an egg maturation status, a method of fertilization for the embryo, a treatment regime for the patient, a hormonal profile of the patient, and an age of the egg donor, a past diagnosis of a condition of the patient, a past diagnosis of a condition of the sperm donor, and an endometrium thickness of the patient.

19. A system for fully automatic evaluation of a human embryo, comprising:
   an imager that acquires an image of the embryo at a specific time point in the development of the embryo;
   a convolutional neural network that generates a plurality of values representing a morphology of the embryo from the image of the embryo, wherein the convolutional neural network is trained on a set of images, each image of the set of images comprising a training embryo representing the specific time point being labeled with an output value representing one of a current quality of the training embryo, a future quality of the training embryo, a likelihood that implantation of the training embryo will be successful, and a likelihood that implantation of the training embryo will result in a live birth; and
   an expert system that evaluates the plurality of values representing the morphology of the embryo to provide an output value representing one of a current quality of the embryo, a future quality of the embryo, a likelihood that implantation of the embryo will be successful, and a likelihood that implantation of the embryo will result in a live birth.

20. The system of claim 19, wherein the expert system further receives a set of values representing biometric parameters of one of a patient receiving the embryo, an egg utilized to produce the human embryo, a sperm donor who provided sperm used to create the embryo, and an egg donor who provided the egg.

* * * * *